United States Patent
Hatanaka et al.

(10) Patent No.: US 10,483,800 B2
(45) Date of Patent: Nov. 19, 2019

(54) PORTABLE DEVICE, CHARGING DEVICE FOR SAME, AND CHARGING SYSTEM FOR PORTABLE DEVICE

(71) Applicant: NITTO DENKO CORPORATION, Ibaraki-shi, Osaka (JP)

(72) Inventors: Takezo Hatanaka, Ibaraki (JP); Hisashi Tsuda, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 26 days.

(21) Appl. No.: 14/767,689

(22) PCT Filed: Nov. 5, 2013

(86) PCT No.: PCT/JP2013/079816
§ 371 (c)(1),
(2) Date: Aug. 13, 2015

(87) PCT Pub. No.: WO2014/129024
PCT Pub. Date: Aug. 28, 2014

(65) Prior Publication Data
US 2015/0372532 A1    Dec. 24, 2015

(30) Foreign Application Priority Data

Feb. 20, 2013    (JP) ................. 2013-031018

(51) Int. Cl.
*H02J 50/12* (2016.01)
*H04R 1/10* (2006.01)
(Continued)

(52) U.S. Cl.
CPC ............ *H02J 50/12* (2016.02); *H02J 7/04* (2013.01); *H02J 50/10* (2016.02); *H04R 1/1025* (2013.01);
(Continued)

(58) Field of Classification Search
CPC .................. H02J 7/025; H02J 5/005
(Continued)

(56) References Cited

U.S. PATENT DOCUMENTS

2005/0244024 A1* 11/2005 Fischer ............... H04R 25/554
381/331
2008/0051854 A1    2/2008 Bulkes et al.
(Continued)

FOREIGN PATENT DOCUMENTS

CN           1684548        10/2015
DE    102008022127 A1    11/2009
(Continued)

OTHER PUBLICATIONS

Alanson P. Sample, David A. Meyer, Joshua R. Smith, "Analysis, Experimental Results, and Range Adaptation of Magnetically Coupled Resonators for Wireless Power Transfer" Published in: IEEE Transactions on Industrial Electronics (vol. 58, Issue: 2, Feb. 2011 ).*
(Continued)

*Primary Examiner* — Drew A Dunn
*Assistant Examiner* — Sailesh Thapa
(74) *Attorney, Agent, or Firm* — Oliff PLC

(57) ABSTRACT

A portable device has an outer wall member exposed outside, and a power-receiving module at least a portion of which is arranged along the surface shape of the outer wall member to receive power by way of the resonance phenomenon. The power-receiving module has a power-receiving resonance coil and a power-drawing coil. The portable device creates a space portion with a weak magnetic field at the inner position or the peripheral position of the power receiving module during power feeding using the resonance phenomenon so that an electronic device is arranged in the space.

21 Claims, 19 Drawing Sheets

(51) Int. Cl.
*H02J 7/04* (2006.01)
*H02J 50/10* (2016.01)
*H04R 25/00* (2006.01)
*G02C 11/06* (2006.01)

(52) U.S. Cl.
CPC ............ *G02C 11/06* (2013.01); *H04R 25/554* (2013.01); *H04R 2225/31* (2013.01); *H04R 2460/17* (2013.01)

(58) Field of Classification Search
USPC ......................................................... 320/108
See application file for complete search history.

(56) References Cited

U.S. PATENT DOCUMENTS

| | | | |
|---|---|---|---|
| 2008/0177133 A1 | 7/2008 | Sakai et al. | |
| 2009/0075704 A1 | 3/2009 | Wang | |
| 2009/0182688 A1 | 7/2009 | van der Zwan et al. | |
| 2010/0244578 A1 | 9/2010 | Yoshikawa | |
| 2010/0244839 A1 | 9/2010 | Yoshikawa | |
| 2011/0080052 A1 | 4/2011 | Sato | |
| 2011/0142270 A1 | 6/2011 | Niederdrank | |
| 2011/0222154 A1 | 9/2011 | Choi et al. | |
| 2011/0241612 A1 | 10/2011 | Ryu et al. | |
| 2011/0255160 A1 | 10/2011 | Lee et al. | |
| 2012/0007549 A1* | 1/2012 | Murayama | H02J 7/025 320/108 |
| 2012/0050015 A1 | 3/2012 | Low et al. | |
| 2012/0127420 A1 | 5/2012 | Blum et al. | |
| 2012/0169275 A1* | 7/2012 | Lee | H02J 7/025 320/108 |
| 2012/0170781 A1* | 7/2012 | Klemenz | H04R 25/554 381/323 |
| 2012/0223674 A1 | 9/2012 | Choi et al. | |
| 2012/0256494 A1* | 10/2012 | Kesler | H03H 7/40 307/104 |
| 2012/0326499 A1 | 12/2012 | Ichikawa et al. | |
| 2013/0120706 A1* | 5/2013 | Kakinuma | G02B 27/2264 351/158 |
| 2014/0247547 A1* | 9/2014 | Jung | H02J 7/025 361/679.26 |

FOREIGN PATENT DOCUMENTS

| | | |
|---|---|---|
| JP | S55-44609 U | 3/1980 |
| JP | 2006-149687 A | 6/2006 |
| JP | 2008-178544 A | 8/2008 |
| JP | 2008-278329 A | 11/2008 |
| JP | 2009-278837 A | 11/2009 |
| JP | 2010-239847 A | 10/2010 |
| JP | 2011-060677 A | 3/2011 |
| JP | 2011-083078 A | 4/2011 |
| JP | 2011-147213 A | 7/2011 |
| JP | 2011-193719 A | 9/2011 |
| JP | 2011-229377 A | 11/2011 |
| JP | 2011-232550 A | 11/2011 |
| JP | 2011-239673 A | 11/2011 |
| WO | 2011/122789 A2 | 10/2011 |

OTHER PUBLICATIONS

Dec. 24, 2013 International Search Report issued in International Patent Application No. PCT/JP2013/079816.
Mar. 29, 2016 Search Report issued in European Patent Application No. 13875854.5.
Jan. 13, 2016 Office Action issued in Singapore Patent Application No. 11201506549R.
Jun. 30, 2016 Search Report issued in European Patent Application No. 13875854.5.
Oct. 24, 2016 Office Action issued in Korean Patent Application No. 10-2015-7025425.
Jan. 10, 2017 Office Action issued in Japanese Patent Application No. 2013-031018.
May 10, 2016 Office Action issued in Taiwanese Patent Application No. 102143585.
Sep. 5, 2017 Office Action issued in Japanese Patent Application No. 2013-031018.
Apr. 5, 2017 Office Action issued in European Patent Application No. 13875854.5.
Apr. 28, 2017 Office Action issued in Korean Patent Application No. 10-2015-7025425.
Jan. 26, 2017 Office Action issued in Chinese Patent Application No. 201380073517.7.
Sep. 1, 2017 Office Action issued in European Patent Application No. 13875854.5.
Sep. 12, 2017 Office Action issued in Chinese Patent Application No. 201380073517.7.
Sample et al.; "Analysis, Experimental Results, and Range Adaptation of Magnetically Coupled Resonators for Wireless Power Transfer;" IEEE Transactions on Industrial Electronics, p. 544-554; Feb. 2011; vol. 58, No. 2.
Mar. 1, 2018 Report of Reconsideration by Examiner before Appeal issued in Japanese Patent Application No. 2013-031018.
Mar. 6, 2018 Notice of Dismissal of Reconsideration by Examiner Before Appeal issued in Japanese Patent Application No. 2013-31018.
Mar. 1, 2018 Summons to Attend Oral Proceedings issued in European Patent Application No. 13875854.5.
Apr. 3, 2018 Office Action issued in Chinese Patent Application No. 201380073517.7.
Oct. 17, 2018 Office Action issued in European Patent Application No. 13875854.5.
Feb. 4, 2019 Office Action issued in European Patent Application No. 18212140.0.
Nov. 20, 2018 Office Action issued in Japanese Patent Application No. 2013-031018.
Apr. 16, 2019 Extended European Search Report issued in European Patent Application No. 18212140.0.

* cited by examiner

PORTABLE DEVICE, CHARGING DEVICE FOR SAME, AND CHARGING SYSTEM FOR PORTABLE DEVICE

TECHNICAL FIELD

The present invention relates to a portable device to which power is supplied by means of resonance phenomenon, a charging device for such a portable device, and a portable device charging system.

BACKGROUND ART

Wireless power transmission technologies which transmit power by utilizing resonance phenomena between resonators (resonance coils) of power-supplying device and a power-receiving device have been attracting attentions in recent years, as power supplying technologies (wireless power transmission technologies) utilizing wireless power transmission between the power-supplying device and the power-receiving device. For example, PTL 1 discloses an electric vehicle having a power-receiving device arranged above a floor surface of the vehicle and a rectifier and a power storage device arranged in a space apart from the power-receiving device, and discloses a system for supplying power from a power-supplying device in a power supplying position to the power-receiving device in the electric vehicle when the electric vehicle is moved to the power supplying position. Further, PTL 2 discloses a structure of a portable computer adopting a wireless power transmission technology utilizing resonance phenomena.

PRIOR ART DOCUMENTS

Patent Literature

PTL 1: Japanese Unexamined Paten Publication No. 147213/2011
PTL 2: Japanese Unexamined Paten Publication No. 239847/2010

SUMMARY OF THE INVENTION

Technical Problem

Here, influences from generated heat and magnetism at the time of supplying power need to be considered when arranging devices such as the power-receiving device and the rectifier. Arrangement positions for devices are not a significant concern in a relatively large device such as the electric vehicle of PTL 1, as they are easily ensured. Incases of portable devices required to be downsized such as the portable computers of PTL 2 on the other hand, there are only limited positions available to avoid influences from the generated heat and magnetism at the time of power supply. Therefore, how each device is arranged is extremely crucial matter for further downsizing.

In view of the above, an object of the present invention is to a portable device and a charging device therefor, and a portable device charging system, which enables further downsizing of the portable device.

Technical Solution

An aspect of the present invention is a portable device, comprising: an outer wall member exposed to outside; a power-receiving module at least partially arranged along a surface shape of the outer wall member, which receives power supplied by means of a resonance phenomenon; and an electronic device disposed in a magnetic field space formed by the resonance phenomenon so as to have a magnetic field strength weaker than that in other portions.

In the above structure, the portable device has the power-receiving module receiving power supplied by means of a resonance phenomenon. The portable device creates a space portion with a weak magnetic field in an inner side position of or a position nearby the power-receiving module, at the time of supplying power. This space is used effectively as a position for arranging an electronic device. Further, by arranging at least a part of the power-receiving module along the surface shape of the outer wall member, the space portion with a weak magnetic field is formed in a desirable shape or made as large as possible. That is, by arranging at least a part of the power-receiving module along the surface shape of the outer wall member, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in a portable device with a difficulty in ensuring a position for arranging the electronic device, consequently enabling downsizing of the portable device.

Another aspect of the present invention is a portable device, comprising: a housing having an outer wall member exposed to outside; a portable case configured to detachably accommodate therein the housing; a power-receiving module at least partially arranged along a surface shape of the outer wall member and/or a surface shape of the portable case, which receives power supplied by means of a resonance phenomenon; and an electronic device disposed in a magnetic field space formed by the resonance phenomenon so as to have a magnetic field strength weaker than that in other portions.

In the above structure, the power-receiving module receiving power supplied by means of a resonance phenomenon is provided in the portable device and/or in the portable case. The portable device creates a space portion with a weak magnetic field in an inner side position of or a position nearby the power-receiving module, at the time of supplying power. This space is used effectively as a position for arranging an electronic device. Further, by arranging at least a part of the power-receiving module along the surface shape of the outer wall member and/or the surface shape of the portable case, the space portion with a weak magnetic field is formed in a desirable shape or made as large as possible. That is, by arranging at least a part of the power-receiving module along the surface shape of the outer wall member and/or the surface shape of the portable case, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in a portable device with a difficulty in ensuring a position for arranging the electronic device, consequently enabling downsizing of the portable device. Further, when the power-receiving module is provided to the outer wall member and the portable case, charging is possible while the housing is detached from or attached to the portable case, which is advantageous in handling the portable device while it is being charged.

Further, another aspect of the present invention is a charging device, comprising a power-supplying module configured to supply power to the power-receiving module of the above described portable device, by means of a resonance phenomenon.

Further, another aspect of the present invention is a portable device charging system, comprising: the above described portable device, and the charging device having the power-supplying module configured to supply power to the power-receiving module of the portable device by means of a resonance phenomenon.

Further, another aspect of the present invention is a human wearable device, comprising: an outer wall member exposed to outside; a power-receiving module at least partially arranged along a surface shape of the outer wall member, which receives power supplied by means of a resonance phenomenon; and an electronic device disposed in a magnetic field space formed by the resonance phenomenon so as to have a magnetic field strength weaker than that in other portions.

In the above structure, the human wearable device has the power-receiving module receiving power supplied by means of a resonance phenomenon. The portable device creates a space portion with a weak magnetic field in an inner side position of or a position nearby the power-receiving module, at the time of supplying power. This space is used effectively as a position for arranging an electronic device. Further, by arranging at least a part of the power-receiving module along the surface shape of the outer wall member, the space portion with a weak magnetic field is formed in a desirable shape or made as large as possible. Thus, by arranging at least a part of the power-receiving module along the surface shape of the outer wall member, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in a hearing aid with a difficulty in ensuring a position for arranging the electronic device, consequently enabling downsizing of the portable device.

Further, another aspect of the present invention is an ear-hanging hearing aid, comprising: a hearing aid main body attachable to a pinna; an ear mold to be abutted to or nearby an ear hole opening; a joint part joining the hearing aid main body and the ear mold; a power-receiving module configured to receive power supplied by means of a resonance phenomenon; and an electronic device disposed in a magnetic field space formed by the resonance phenomenon so as to have a magnetic field strength weaker than that in other portions, wherein at least a part of the power-receiving module is disposed along at least one of a surface shape of an outer wall member of the hearing aid main body, a surface shape of an outer wall member of the ear mold, and a surface shape of an outer wall member of the joint part.

According to the above, a hearing aid main body attachable to a pinna; an ear mold to be abutted to or nearby an ear hole opening; and a joint part joining the hearing aid main body and the ear mold form an ear-hanging hearing aid. With this ear-hanging hearing aid having the power-receiving module receiving power supplied by means of a resonance phenomenon, a space portion with a weak magnetic field is created in an inner side position of or a position nearby the power-receiving module, at the time of supplying power. This space is used effectively as a position for arranging an electronic device. Further, by arranging at least a part of the power-receiving module along the surface shape of any of the outer wall members, the space portion with a weak magnetic field is formed in a desirable shape or made as large as possible. Thus, by arranging at least a part of the power-receiving module along the surface shape of the outer wall member, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in an ear-hanging hearing aid with a difficulty in ensuring a position for arranging the electronic device, consequently enabling downsizing of the portable device.

The ear-hanging hearing aid of the present invention may be formed by a solenoid coil disposed along an outline of the hearing aid main body.

Further, the ear-hanging hearing aid of the present invention may be adapted so that the power-receiving module is formed by a planar coil arranged on an outer wall surface, on the inside of the outline of the hearing aid main body.

Further, the ear-hanging hearing aid of the present invention may be adapted so that the power-receiving module is formed by a solenoid coil arranged to cross the outline of the hearing aid main body.

Further, the ear-hanging hearing aid of the present invention may be adapted so that the power-receiving module is formed by a solenoid coil or a planar coil arranged in the periphery of an abutting portion of the ear mold to be abutted to or nearby the ear hole opening.

Further, another aspect of the present invention is an ear hole fitting hearing aid, comprising: a housing having a cylindrical shell part configured to abut a surface of an external auditory canal in the hear hole, a face plate part arranged on the pinna side of the shell part, a leading end part arranged on the inner ear side of the shell part; a power-receiving module configured to receive power supplied by means of a resonance phenomenon; and an electronic device disposed in a magnetic field space formed by the resonance phenomenon so as to have a magnetic field strength weaker than that in other portions, wherein at least a part of the power-receiving module is disposed along at least one of a surface shape of the shell part or a surface shape of the face plate part.

According to the above, a housing having a cylindrical shell part configured to abut a surface of an external auditory canal in the hear hole, a face plate part arranged on the pinna side of the shell part, a leading end part arranged on the inner ear side of the shell part forms an ear hole fitting hearing aid. With this ear hole fitting hearing aid having the power-receiving module receiving power supplied by means of a resonance phenomenon, a space portion with a weak magnetic field is created in an inner side position of or a position nearby the power-receiving module, at the time of supplying power. This space is used effectively as a position for arranging an electronic device. Further, by arranging at least a part of the power-receiving module along the surface shape of any of the outer wall members, the space portion with a weak magnetic field is formed in a desirable shape or made as large as possible. Thus, by arranging at least a part of the power-receiving module along the surface shape of the outer wall member, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in an ear hole fitting hearing aid with a difficulty in ensuring a position for arranging the electronic device, consequently enabling downsizing of the portable device.

Further, the ear hole fitting hearing aid of the present invention may be adapted so that the power-receiving module is formed by a solenoid coil arranged along an outline of the shell part.

Further, the ear hole fitting hearing aid of the present invention may be adapted so that the power-receiving module is formed by a solenoid coil arranged along an outline of the face plate part.

Further, the ear-hanging hearing aid of the present invention may be adapted so that the power-receiving module is formed by a solenoid coil arranged to cross the outlines of the shell part and the face plate part.

Further, another aspect of the present invention is a glasses-type hearing aid, comprising: a frame including a pair of lenses configured to correct eyesight, a pair of rims for supporting the pair of lenses, respectively, a bridge for joining the rims, closing blocks provided to the rims, respectively, and temples to be worn on pinnae, which are supported by the closing blocks in such a manner as to be capable of moving rotationally; a power-receiving module configured to receive power supplied by means of a resonance phenomenon; and an electronic device disposed in a magnetic field space formed by the resonance phenomenon so as to have a magnetic field strength weaker than that in other portions, wherein at least a part of the power-receiving module is disposed along a surface shape of the frame.

According to the above, the frame supporting the pair of lenses and configured to be wearable on the pinnae forms a glasses-type hearing aid. With this glasses-type hearing aid having the power-receiving module receiving power supplied by means of a resonance phenomenon, a space portion with a weak magnetic field is created in an inner side position of or a position nearby the power-receiving module, at the time of supplying power. This space is used effectively as a position for arranging an electronic device. Further, by arranging at least a part of the power-receiving module along the surface shape of the frame, the space portion with a weak magnetic field is formed in a desirable shape or made as large as possible. Thus, by arranging at least a part of the power-receiving module along the surface shape of the frame, the level of freedom in size and shaping of the space portion with a weak magnetic field is improved. Since the space portion appearing in an inner side position of or a position nearby the power-receiving module is set in a size and a shape suitable for arranging therein an electronic device, a position for arranging an electronic device is easily ensured even in a glasses-type hearing aid with a difficulty in ensuring a position for arranging the electronic device, consequently enabling downsizing of the portable device.

Further, the glasses-type hearing aid of the present invention may be adapted so that the power-receiving module is formed by a solenoid coil arranged along the outline of one of the temples and/or the outline of one of the rims.

Further, the glasses-type hearing aid of the present invention may be adapted so that the power-receiving module is formed by a solenoid coil arranged along an outlines of the pair of rims and the bridge.

Further, the glasses-type hearing aid of the present invention may be adapted so that the power-receiving module is formed by a solenoid coil arranged to cross the outline of the temples.

Further, the glasses-type hearing aid of the present invention may be adapted so that the power-receiving module is formed by a planar coil arranged on the outer wall surface, on the inside of the outline of at least one of the temples.

Further, another aspect of the present invention is a charging device for a hearing aid, comprising a power-supplying module configured to supply power to the power-receiving module of any of the above described aspects, by means of a resonance phenomenon.

Further, another aspect of the present invention is a hearing aid charging system, comprising: any of the above described hearing aids, and the charging device having the power-supplying module configured to supply power to the power-receiving module of the portable device by means of a resonance phenomenon.

Advantageous Effects

The present invention enables downsizing of a portable device.

DESCRIPTION OF EMBODIMENTS (Charging System)

Figure 1:
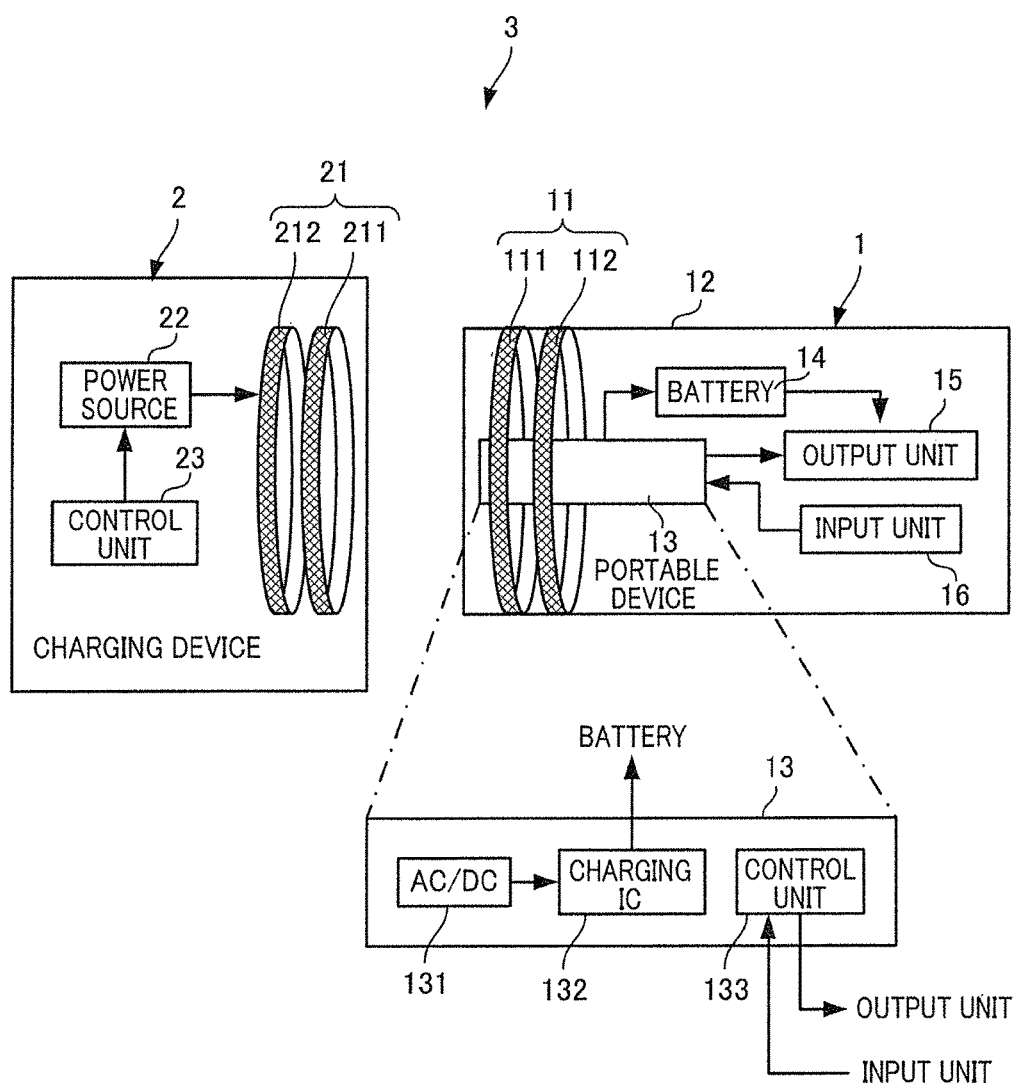
FIG. 1 is a block diagram of a charging system.

As shown in FIG. 1, a charging system 3 of the present embodiment includes: a portable device 1 having a power-receiving module 11, and a charging device 2 having a power-supplying module 21 configured to supply power to the power-receiving module 11 of the portable device 11 by means of a resonance phenomenon.

(Portable Device)

The portable device 1 has a structure which creates a space portion with a weak magnetic field in an inner side position of or a position nearby the power-receiving module 11, when power is supplied by utilizing a resonance phenomenon. This space portion is used as a position for arranging an electronic device 13. This way, the portable device 1 restrains occurrence of an eddy current attributed to a magnetic field of the electronic device 13 in the space portion, thus preventing malfunctions and generating of heat of a predetermined temperature or higher, and further enables downsizing. The expression "a space portion with a weak magnetic field" is detailed later.

Specifically, the portable device 1 has an outer wall member 12, and a power-receiving module 11 at least partially arranged along a surface shape of the outer wall member 12, which receives power supplied by means of a resonance phenomenon. The power-receiving module 11 includes a power-receiving resonance coil 111 and a power-drawing coil 112. Example types of coils used as the power-receiving resonance coil ill or the power-drawing coil 112 include: a spiral type, a solenoid type, and a loop type.

The portable device 1 includes an electronic device 13 having at least one electronic circuit, and a battery 14 configured to supply operation power. The portable device 1 further includes an output unit 15 such as a speaker, light emitting member, a display, and an input unit 16 such as a microphone or a switch. Specifically, the portable device 1 includes an electronic device, 13 such as an AC/DC converter 131, a charging unit 132, and a control unit 133. The electronic device 13 is at least partially arranged in a space portion (magnetic field space) formed by a resonance phenomenon, which space has a weaker magnetic field strength than that of the other portions. The AC/DC converter 131 has a function of converting an AC power supplied to the power-receiving module 11 to a DC power. The charging unit 132 has a function of charging the battery 14. The control unit 133 is connected to the output unit 15 and the input unit 16, and has a function of outputting control signals to the output unit 15, a function of receiving input signals from the input unit 16, and a function of processing various information and data for use in the portable device 1. It should be noted that the present embodiment describes the battery 14, the output unit 15, and the input unit 16 as units separate from the electronic device 13; however, the electronic device 13 may include the battery 14, the output unit 15, and the input unit 16. In other words, the battery 14, the output unit 15, and the input unit 16 may be arranged in the space portion (magnetic field space).

The battery 14 capable of being charged by the charging unit 132 is constituted by a rechargeable secondary battery. Examples of the battery 14 include: a lead storage battery or a lithium ion secondary battery, a lithium ion polymer secondary battery, a nickel hydrogen cell, a nickel-cadmium cell, nickel☐iron cell, a zinc-nickel oxide cell, a silver oxide-zinc cell, and the like. It should be noted that the battery 14 may be a capacitor, instead of a secondary battery.

By arranging at least a part of the power-receiving module 11 along the surface shape of the outer wall member 12, the space portion with a weak magnetic field is formed in a desirable shape or made as large as possible. Thus, by arranging at least a part of the power-receiving module 11 along the surface shape of the outer wall member 12, the level of freedom in size and shaping of the space portion with a weak magnetic field is improved. Since the space portion appearing in an inner side position of or a position nearby the power-receiving module 11 is set in a size and a shape suitable for arranging therein an electronic device 13, a position for arranging an electronic device 13 is easily ensured even in a portable device 1 with a difficulty in ensuring a position for arranging the electronic device 13, consequently enabling downsizing of the portable device 1.

The "resonance phenomenon" here is a phenomenon in which two or more coils are tuned to a resonance frequency. The outer wall member 12 may be a part of or the entirety of the housing of the portable device 1, or may be a part or the entirety of a cover or an accessory member, other than the housing. By "arranging along the surface shape of the outer wall member 12", it does not intend to impose any limitation as to the positions and method of arrangement, provided that an object is arranged along the surface shape of the outer wall member 12. For example, at least apart of the power-receiving module 11 in a space outside or the inside the outer wall member 12 may be arranged a predetermined distance away from the surface of the outer wall member 12 in a direction perpendicular to the surface. Alternatively, at least a part of the power-receiving module 11 may be arranged on the outer surface or the inner surface of the outer wall member 12 by means of printing and the like, or embedded on the outer wall member 12.

The portable device 1 encompasses any hand-held device and wearable device (human wearable device). Specific examples of the portable device include a portable computer (a laptop PC, a tablet PC, or the like), a camera, an audio visual device (a mobile music player, an IC recorder, a portable DVD player, or the like), a calculator (such as a pocket computer and an electronic calculator), a game console, a computer peripheral (a portable printer, a portable scanner, a portable modem, or the like), a dedicated information device (an electronic dictionary, an electronic notebook, an electronic book, a portable data terminal, or the like), a mobile communication terminal, a voice communication terminal (a mobile phone, a PHS, a satellite phone, a third party radio system, an amateur radio, a specified low power radio, a personal radio, a citizen radio, or the like), a data communication terminal (a mobile phone, a PHS (a feature phone and a smart phone), a pager, or the like), a broadcasting receiver (a television receiver and a radio), a portable radio, a portable television receiver, a one seg receiver, another type of device (a wristwatch and a pocket watch), a hearing aid, a hand-held GPS, a security buzzer, a flashlight/pen light, a battery pack, and an extracorporeal device (such as a sound processor and an audio processor) of an intracochlea implant system.

(Charging Device)

The charging device 2 configured to perform charging with respect to the portable device 1 as described above has a power-supplying module 21 configured to supply power by means of resonance phenomenon. The power-supplying module 21 includes a power-supplying resonance coil 211 and a power-supplying coil 212. Example types of coils used as the power-supplying resonance coil 211 or the power-supplying coil 212 include: a spiral type, a solenoid type, and a loop type. The charging device 2 includes a power source unit 22 supplying AC power to the power-supplying module 21 and a control unit 23 controlling the power source unit 22.

The charging device 2, as is the case with the portable device 1, may have a structure which creates a space portion with a weak magnetic field in an inner side position of or a position nearby the power-supplying module 21, when power is supplied by utilizing a resonance phenomenon. This space portion may be used as a position for arranging the power source unit 22 and the control unit 23. This way, it is possible to downsize not only the portable device 1, but also the charging device 2.

(Space Portion with Weak Magnetic Field)

The following details the space portion with a weak magnetic field, which essentially serve as a position of the portable device 1 for arranging the electronic device 13.

The portable device 1 is configured to form the space portion with a weak magnetic field at a desirable position. The formation of the space portion at the desired position is realized by setting power supply conditions such as a positional relation with the charging device 2, a power-supplying state, and an internal structure.

For example, the portable device 1 may be arranged such that, when power is supplied by the resonance phenomenon from the power-supplying resonance coil 211 of the power-supplying module 21 of the charging device 2 to the power-receiving resonance coil 111 of the power-receiving module 11, a magnetic field space having a magnetic field strength lower than the magnetic field strengths in parts other than the desired position is formed as the space portion, at a desired position between the power-supplying resonance coil 211 of the power-supplying module and the power-receiving resonance coil 111 of the power-receiving module 11. In this case, the space portion is created in a position nearby the power-receiving module 11, closer to the charging device 2. Therefore, the leading end portion side of the outer wall member 12 is ensured as the position for arranging the electronic device 13, by slightly shifting towards back side the position for arranging the power-receiving module 11 from the leading end portion of the outer wall member 12 on the side of the charging device 2.

A method of forming the space portion will be detailed. When power is supplied from the power-supplying resonance coil 211 of the power-supplying module 21 of the charging device 2 to the power-receiving resonance coil 111 of the power-receiving module 11 of the portable device 1 by the resonance phenomenon, for example, the frequency of the power supplied to the power-supplying resonance coil 211 of the power-supplying module 21 is set in such a way that the direction of the current flowing in the power-supplying resonance coil 211 of the power-supplying module 21 is opposite to the direction of the current flowing in the power-receiving resonance coil 111 of the power-receiving module 11.

In the formation method above, when power transmission using the resonance phenomenon is performed, the coupling coefficient indicating the strength of the coupling between the power-supplying resonance coil 211 and the power-receiving resonance coil 111 is increased as the power-supplying resonance coil 211 of the power-supplying module 21 and the power-receiving resonance coil 111 of the power-receiving module 11 are disposed to be close to each other. When a transmission characteristic "S21" (which is an index of the power transmission efficiency in the power transmission from the power-supplying resonance coil 211 to the power-receiving resonance coil 111) is measured while the coupling coefficient is high as above, the analyzed waveform of the transmission characteristic "S21" has separate peaks; one on a low frequency side and another on a high frequency side. As the frequency of the power supplied to the power-supplying resonance coil 211 is set at a frequency around the peak on the high frequency side, the direction of the current flowing in the power-supplying resonance coil 211 is arranged to be opposite to the direction of the current flowing in the power-receiving resonance coil 111, and hence the magnetic field generated on the inner circumference side of the power-supplying resonance coil 211 and the magnetic field generated on the inner circumference side of the power-receiving resonance coil ill cancel each other out, with the result that an influence of the magnetic field is reduced on the inner circumference sides of the power-supplying resonance coil 211 and the power-receiving resonance coil 111. With this, the magnetic field space having a magnetic field strength lower than the magnetic field strengths in parts other than the inner circumference sides of the power-supplying resonance coil 211 and the power-receiving resonance coil 111 is formed as the space portion.

In another method of forming the space portion, for example, when power is supplied from the power-supplying resonance coil 211 to the power-receiving resonance coil 111 by the resonance phenomenon, the frequency of the power supplied to the power-supplying resonance coil 211 is set so that the direction of the current flowing in the power-supplying resonance coil 211 is identical with the direction of the current flowing in the power-receiving resonance coil ill.

According to the method above, when power transmission using the resonance phenomenon is performed, the coupling coefficient indicating the strength of the coupling between the power-supplying resonance coil 211 and the power-receiving resonance coil ill is increased as the power-supplying resonance coil 211 and the power-receiving resonance coil 111 are disposed to be close to each other. When the coupling coefficient is high in this manner, the measurement of the transmission characteristic shows that a measured waveform has two separated peaks on the low frequency side and the high frequency side, respectively. As the frequency of the power supplied to the power-supplying resonance coil 211 is set at a frequency around the peak on the low frequency side, the direction of the current flowing in the power-supplying resonance coil 211 is arranged to be identical with the direction of the current flowing in the power-receiving resonance coil 111, and hence the magnetic field generated on the outer circumference side of the power-supplying resonance coil 211 and the magnetic field generated on the outer circumference side of the power-receiving resonance coil 111 cancel each other out, with the result that an influence of the magnetic field is reduced on the outer circumference sides of the power-supplying resonance coil 211 and the power-receiving resonance coil 111. With this, a magnetic field space having a magnetic field strength lower than the magnetic field strengths in parts other than the outer circumference sides of the power-supplying resonance coil 211 and the power-receiving resonance coil 111 is formed as the space portion.

In addition to the above, the size of the space portion may be set based on the strength of the magnetic coupling between the power-supplying resonance coil 211 and the power-receiving resonance coil 111, by changing adjustment parameters regarding the power-supplying resonance coil 211 and the power-receiving resonance coil 111. For example, the size of the Magnetic field space is increased by relatively weakening the magnetic coupling between the power-supplying resonance coil 211 and the power-receiving resonance coil 111. In the meanwhile, the size of the magnetic field space is decreased by relatively strengthening the magnetic coupling between the power-supplying resonance coil 211 and the power-receiving resonance coil 111. As such, a space portion optimum for the size of the portable device 1 is formed.

Alternatively, the size of the magnetic field space may be changed in such a way that the arrangement relation of the power-supplying resonance coil 211 and the arrangement relation of the power-receiving resonance coil 111 are used as the adjustment parameters, and the adjustment parameters are changed to change the strength of the magnetic coupling between the power-supplying resonance coil 211 and the power-receiving resonance coil 111.

Furthermore, the shape of the space portion may be arranged to be a desired shape in such a way that the shapes of the power-supplying resonance coil 211 and the power-receiving resonance coil 111 are used as the adjustment parameters, and the shapes of these coils are changed in a desirable manner to change the strength of the magnetic coupling between and around the power-supplying resonance coil 211 and the power-receiving resonance coil 111. In this case, as the power-supplying resonance coil 211 and the power-receiving resonance coil 111 are arranged to have desired shapes, a magnetic field space having a relatively low magnetic field strength is formed with a desired shape corresponding to the shapes of the coils.

In addition to the above, the size of the space portion may be set in such a way that at least one of the 1st distance between the power-supplying resonance coil 211 and the power-supplying coil 212 and the 2nd distance between the power-drawing coil 112 and the power-receiving resonance coil 111 is used as an adjustment parameter, and the size is set based on this adjustment parameter. For example, the size of the magnetic field space is increased in such a way that the 1st distance between the power-supplying resonance coil 211 and the power-supplying coil 212 and the 2nd distance between the power-drawing coil 112 and the power-receiving resonance coil 111 are relatively shortened so that the magnetic coupling is relatively weakened. In the meanwhile, the size of the magnetic field space is decreased in such a way that the 1st distance between the power-supplying resonance coil 211 and the power-supplying coil 212 and the 2nd distance between the power-drawing coil 112 and the power-receiving resonance coil 111 are relatively elongated so that the magnetic coupling is relatively strengthened.

In addition to the above, the magnetic field space may be formed as the space portion at a desired position with a magnetic field strength lower than the magnetic field strengths in parts other than the desired position, in such a manner that, the magnetic member is provided to cover at least apart of the power-receiving resonance coil 111 and the power-supplying resonance coil 211 except the surfaces where these coils oppose each other, and power transmission is carried out by changing the magnetic field between the power-supplying resonance coil 211 and the power-receiving resonance coil 111. It should be noted that the magnetic member may be arranged on the surface of the outer wall member 12, or embedded into the outer wall member 12.

Further, the outer wall member 12 may include a non-magnetic portion (made of resin) and a magnetic portion (made of resin and magnetic powder), and the magnetic member may be that magnetic portion. That is, the magnetic portion of the outer wall member 12 is formed by resin in which magnetic powder is dispersed. The resin may be thermosetting resin or thermoplastic resin, and is not particularly limited. Examples of the thermosetting resin include epoxy resin, phenol resin, melamine resin, vinyl ester resin, cyano ester resin, maleimide resin, and silicon resin. Examples of the thermoplastic resin include acrylic resin, vinyl acetate based resin, and poly vinyl alcohol based resin.

Further, soft magnetic powder is used as the magnetic powder dispersed in the resin. Examples of the soft magnetic powder include pure Fe, Fe—Si, Fe—Al—Si (sendust), Fe—Ni (permalloy), soft ferrites, Fe-base amorphous, Co-base amorphous, and Fe—Co (permendur); however, is not particularly limited.

The magnetic member may be provided to cover the inner circumferential surface of the power-receiving resonance coil 111. In this case, by blocking the magnetic field generated on the inner circumference side of the power-receiving resonance coil 111, a magnetic field space having a relatively low magnetic field strength is formed as the space portion on the inner circumference side of the power-receiving resonance coil 111.

In addition to the above, the magnetic member may be provided to cover the surfaces of the power-supplying resonance coil 211 and the power-receiving resonance coil 111, which surfaces are opposite to the surfaces where the coils oppose each other. In this case, by blocking the magnetic field generated at around the surface opposite to the opposing surface of the power-receiving resonance coil 111, a magnetic field space having a relatively low magnetic field strength is formed as the space portion at around the surface opposite to the opposing surface of the power-receiving resonance coil 111.

As such, the portable device 1 is arranged such that, based on one or more combination of at least one of the above-described methods of forming the space portion, a magnetic field space having a low magnetic field strength can be intentionally formed at will as the space portion at and around the inner side of the power-receiving module 11, and the size and shape of the space portion can be arbitrarily set. In other words, in the portable device 1, a desired space portion can be formed by adjusting the layout of the power-receiving module 11.

Further, the portable device 1 may have a portable case having a power-receiving module. The portable case is configured to detachably accommodate therein the housing. The power-receiving module is at least partially arranged along a surface shape of the portable case, and is configured to receive power supplied by means of a resonance phenomenon; and In this magnetic field space generated in the portable device 1 (housing) by the resonance phenomenon at the time of supplying power, the electronic device 13 is arranged. With this structure, the power-receiving module 11 does not necessarily have to be provided in the housing of the portable device 1. If the power-receiving module is provided to the both of the housing and the portable case, the portable device 1 is chargeable irrespective of the presence of the portable case.

(Hearing Aid)

The following details a case of applying the portable device 1 as described above to a hearing aid which is a human wearable device. Examples of the hearing aid include: a pocket type (box type) hearing aid, an ear-hanging hearing aid (BTE), an ear hole fitting hearing aid (ITE), a canal type hearing aid (ITC), a CIC type hearing aid (CIC), an open ear type hearing aid, an RIC type hearing aid (RIC), a bone conduction type hearing aid, an implantable hearing aid.

(Hearing Aid: Ear-Hanging Hearing Aid)

Figure 2:
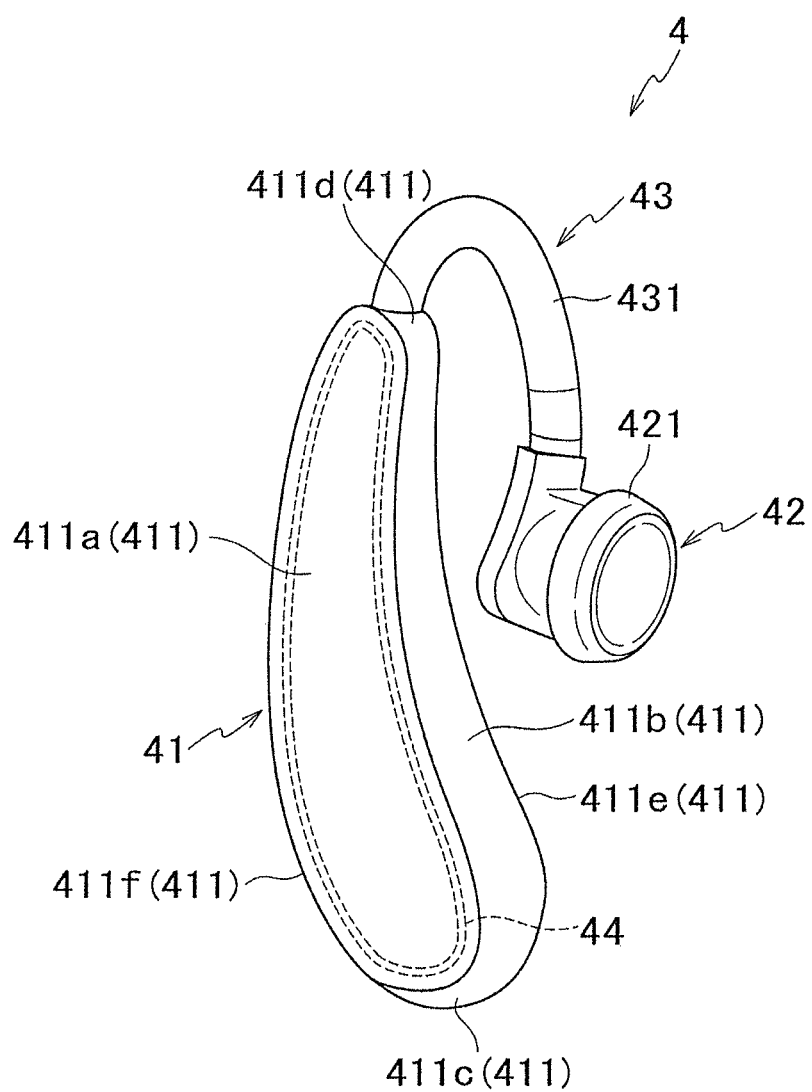
FIG. 2 is a perspective diagram of an ear-hanging hearing aid.

As shown in FIG. 2, an ear-hanging hearing aid 4 includes a hearing aid main body 41 attachable to a pinna; an ear mold 42 to be abutted to or nearby an ear hole opening; a joint part 43 joining the hearing aid main body 41 and the ear mold 42; a power-receiving module 44 configured to receive power supplied by means of a resonance phenomenon; and an electronic device disposed in a magnetic field space formed by the resonance phenomenon so as to have a magnetic field strength weaker than that in other portions. At least a part of the power-receiving module 44 is disposed along at least one of a surface shape of an outer wall member 411 of the hearing aid main body 41, a surface shape of an outer wall member 421 of the ear mold 42, and a surface shape of an outer wall member 431 of the joint part 43.

By arranging at least a part of the power-receiving module 44 along the surface shape of the outer wall member 411, 421, or 431, the space portion with a weak magnetic field is formed in a desirable shape or made as large as possible. Since the space portion appearing in an inner side position of or a position nearby the power-receiving module 44 is set in a size and a shape suitable for arranging therein an electronic device, a position for arranging an electronic device is easily ensured even in an ear-hanging hearing aid 4 with a difficulty in ensuring a position for arranging the electronic device, consequently enabling downsizing of the portable device.

The ear-hanging hearing aid 4 is described further in detail. The hearing aid main body 41 has a hexahedral housing (outer wall member) which is curved from the top part to the bottom part so as to fit the root of the pinna. That is, the housing of the hearing aid main body 41 includes: a top surface portion 411d positioned in the top part; a bottom surface portion 411c positioned in the bottom part; a head-contacting surface portion 411a to contact the head; a pinna-contacting surface portion 411e opposing the head-contacting surface portion 411a, which contacts the pinna; an inside contacting surface portion 411b which contacts the root of the pinna in a surface-to-surface manner; an outside surface portion 411f on the opposite side of the inside contacting surface portion 411b.

Inside the housing of the hearing aid main body 41 is arranged an electronic device. The electronic device includes: a microphone configured to collect sounds outside; an amplifier configured to amplify signals representing the collected sounds at a constant gain; an A/D converter; a control IC configured to control circuits; a speaker; and a battery chargeable with power supplied via a power-receiving module 44. Further, the hearing aid main body 41 includes an operation unit having an operational buttons for controlling the sound volume levels and powering on and off.

To the top surface portion 411d of the hearing aid main body 41 is connected an end portion of the joint part 43. The joint part 43 is formed as a tubular manner. The other end of the joint part 43 is connected to the ear mold 42. With the above described ear-hanging hearing aid 4, the sounds collected and amplified by the hearing aid main body 41 is output to the ear mold 42 via the joint part 43, thereby making the sounds clearly audible to the user of the ear-hanging hearing aid 4.

The ear-hanging hearing aid 4 structured as above has a power-receiving module 44. The power-receiving module 44 has a solenoid coil arranged along the outline of the hearing aid main body 41. Specifically, the power-receiving module 44 has a solenoid coil arranged along the outline of the housing of the hearing aid main body 41. The power-receiving module 44 is arranged along the outline of the head-contacting surface portion 411a.

Figure 3:
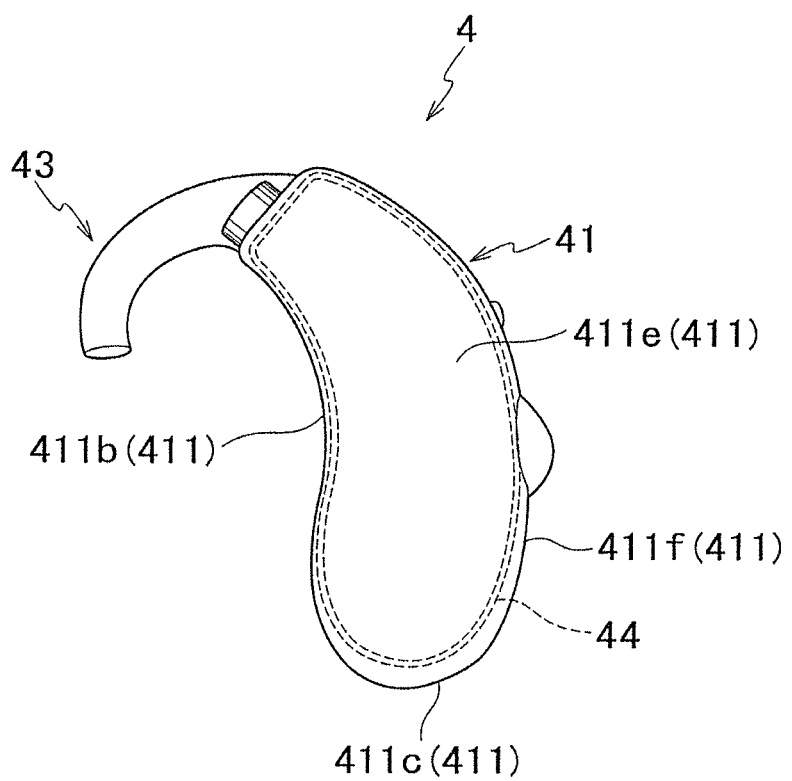
FIG. 3 is an explanatory diagram showing an arrangement of a power-receiving module in the ear-hanging hearing aid.
Figure 6:
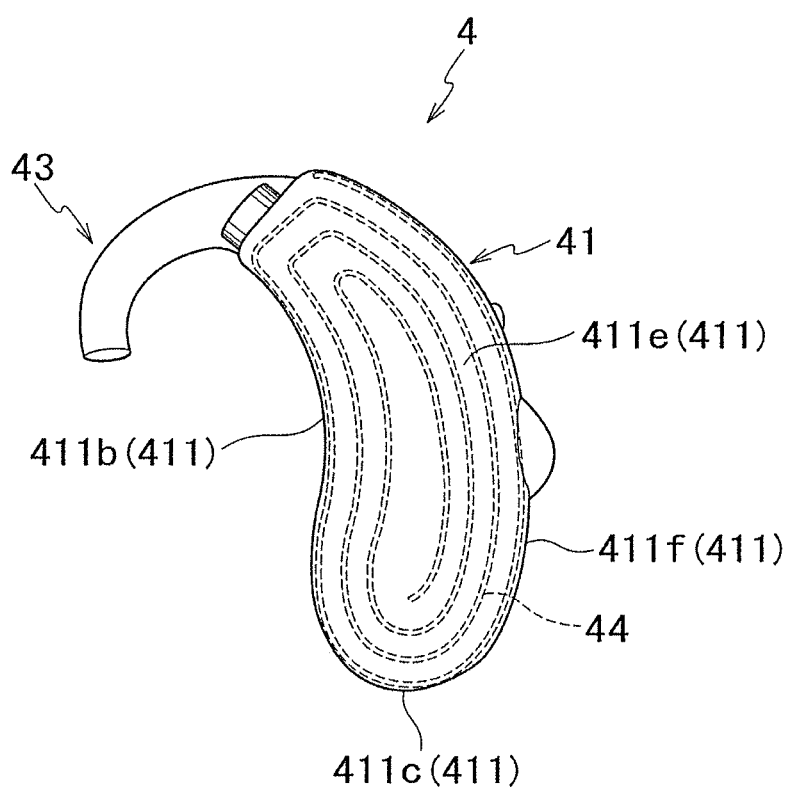
FIG. 6 is an explanatory diagram showing an arrangement of a power-receiving module in the ear-hanging hearing aid.
Figure 7:
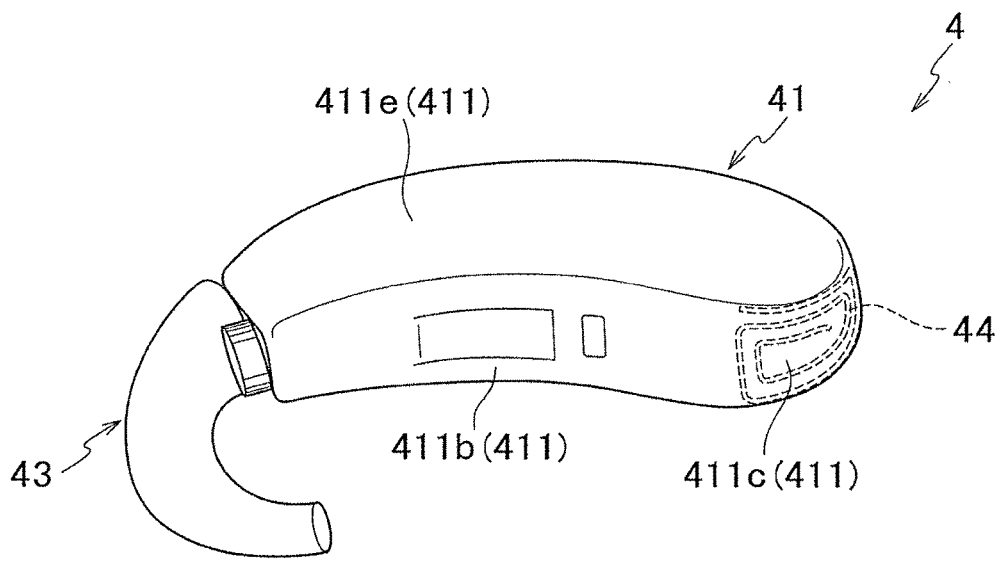
FIG. 7 is an explanatory diagram showing an arrangement of a power-receiving module in the ear-hanging hearing aid.
Figure 8:
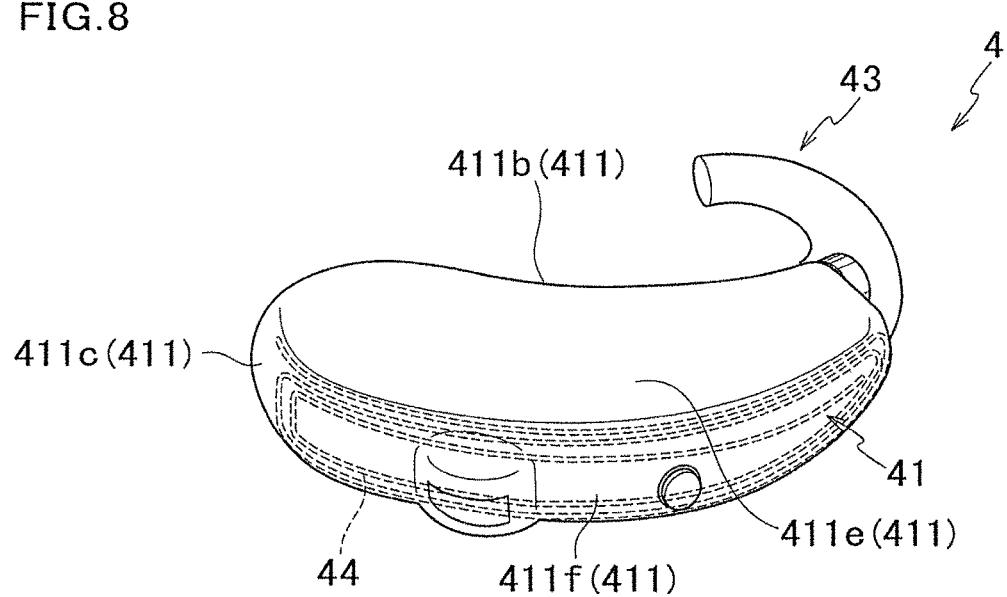
FIG. 8 is an explanatory diagram showing an arrangement of a power-receiving module in the ear-hanging hearing aid.

It should be noted that, as shown in FIG. 3, the power-receiving module 44 may be arranged along the outline of the pinna-contacting surface portion 411e. Further, the power-receiving module 44 may have a planar coil arranged along the outline of the housing of the hearing, aid main body 41. Specifically, the power-receiving module 44 may be arranged along the outline of the pinna-contacting surface portion 411e as shown in FIG. 6, along the outline of the bottom surface portion 411c as shown in FIG. 7, or along the outline of the outside surface portion 411f as shown in FIG. 8. Further, the power-receiving module 44 may have the planar coil arranged on an outer wall surface, on the inside of the outline of the hearing aid main body 41, as shown in FIG. 6 to FIG. 8.

That is, the power-receiving module 44 may have either a solenoid coil or a planar coil. The power-receiving module 44 having either a solenoid coil or a planar coil is arranged along the outline of at least one of the surface portions 411a to 411f of the housing of the hearing aid main body 41. The power-receiving module 44 having a planar coil may be arranged on the outer wall surface, within an outline of at least one of the surface portions 411a to 411f of the housing of the hearing aid main body 41.

Figure 4:
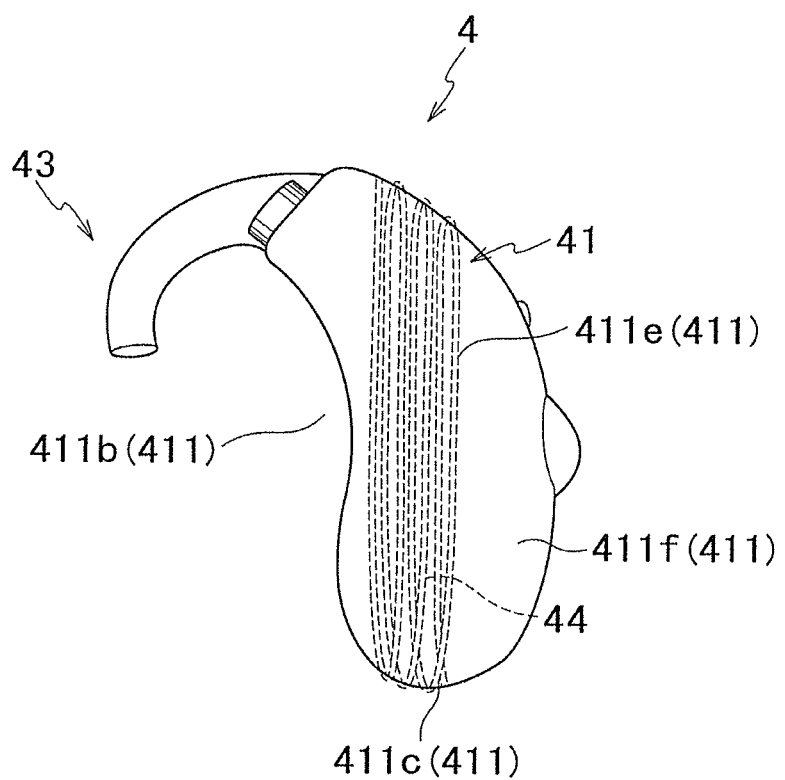
FIG. 4 is an explanatory diagram showing an arrangement of a power-receiving module in the ear-hanging hearing aid.
Figure 5:
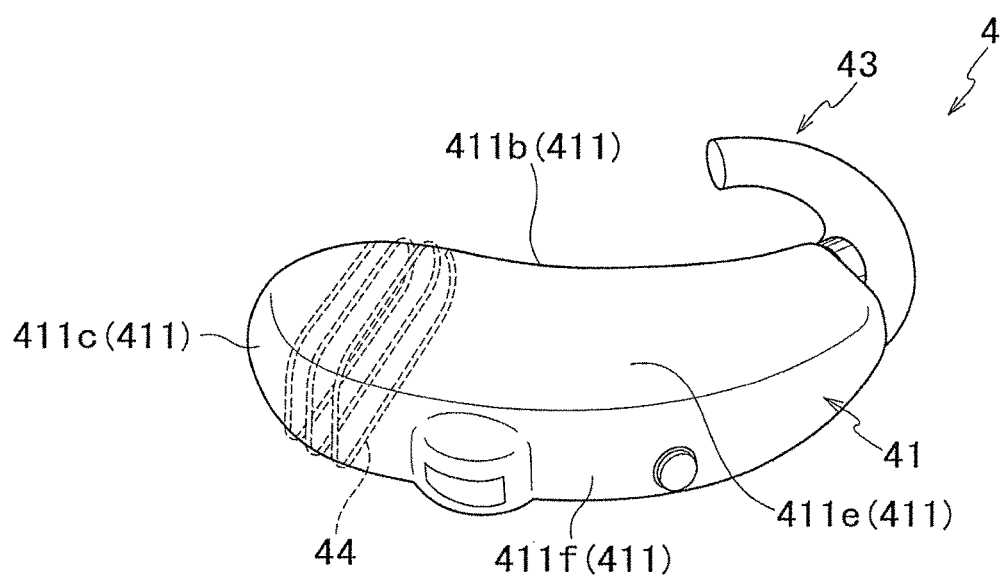
FIG. 5 is an explanatory diagram showing an arrangement of a power-receiving module in the ear-hanging hearing aid.
Figure 9:
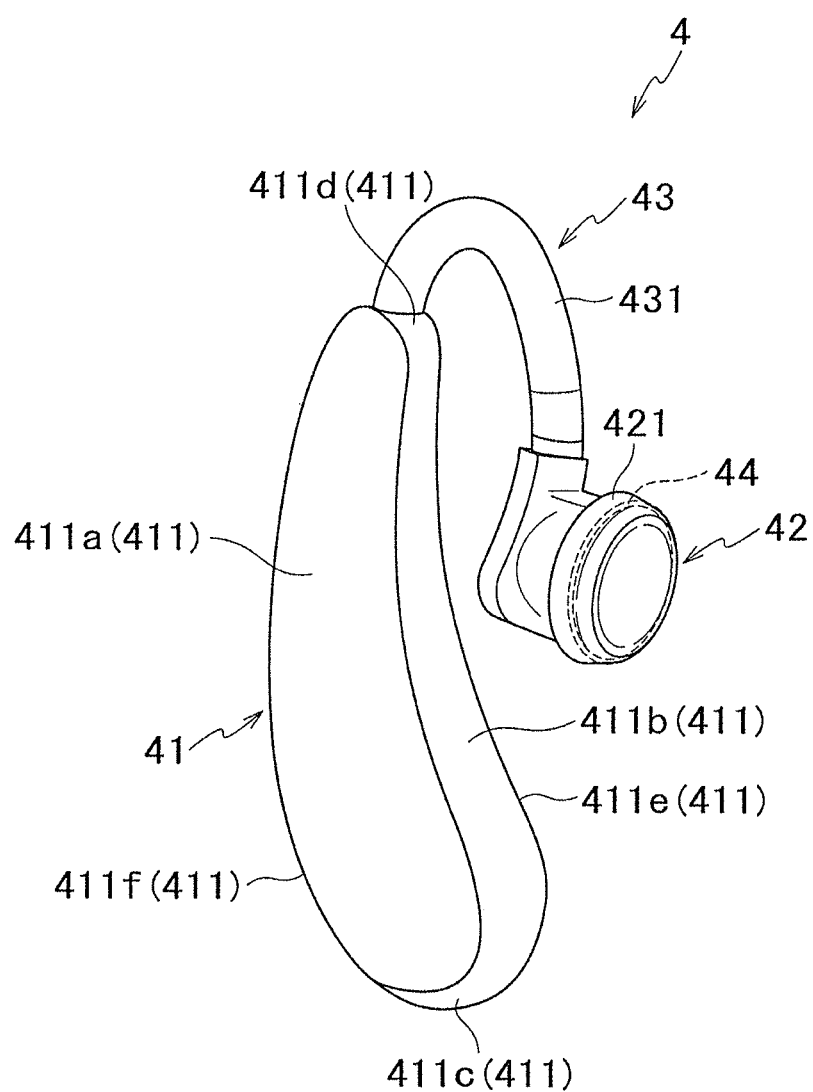
FIG. 9 is an explanatory diagram showing an arrangement of a power-receiving module in the ear-hanging hearing aid.

Further, the power-receiving module 44 may be formed by a solenoid coil arranged to cross the outline of the hearing aid main body 41. Specifically, the power-receiving module 44 may be wound around the bottom surface portion 411c, the pinna-contacting surface portion 411e, the top surface portion 411d, and the head-contacting surface portion 411a as shown in FIG. 4, or wound around the pinna-contacting surface portion 411e, the inside contacting surface portion 411b, the head-contacting surface portion 411a, and the outside surface portion 411f as shown in FIG. 5. Further, as shown in FIG. 9, the power-receiving module 44 is formed by a solenoid coil or a planar coil arranged in the periphery of an abutting portion of the ear mold 42 to be abutted to or nearby the ear hole opening.

(Hearing Aid: Ear Hole Fitting Hearing Aid)

Figure 10:
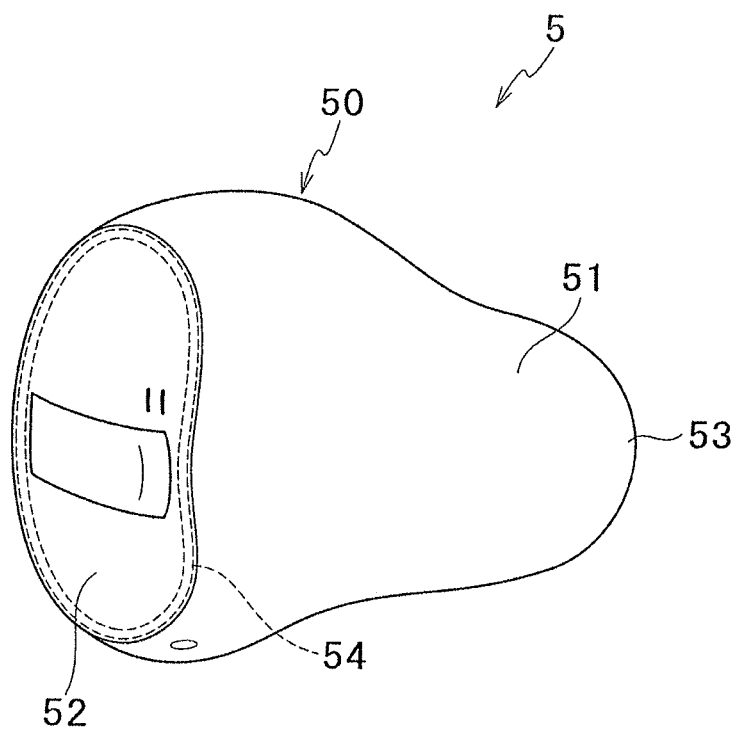
FIG. 10 is an explanatory diagram showing an arrangement of a power-receiving module in an ear hole fitting hearing aid.

As shown in FIG. 10, an ear hole fitting hearing aid 5 includes: a housing 50 having a cylindrical shell part 51 configured to abut a surface of an external auditory canal in the hear hole, a face plate part 52 arranged on the pinna side of the shell part 51, and a leading end portion 53 arranged on the inner ear side of the shell part 51; a power-receiving module 54 configured to receive power supplied by means of a resonance phenomenon; and an electronic device disposed in a magnetic field space formed by the resonance phenomenon so as to have a magnetic field strength weaker than that in other portions. Further, at least a part of the power-receiving module 54 is disposed along at least one of a surface shape of the shell part 51 or a surface shape of the face plate part 52. It should be noted that the electronic device has the same structure as that of the electronic device in the above described ear-hanging hearing aid 4.

By arranging at least a part of the power-receiving module 54 along the surface shape of the outer wall member of the housing 50, the level of freedom in size and shaping of the space portion with a weak magnetic field is improved. Since the space portion appearing in an inner side position of or a position nearby the power-receiving module 54 is set in a size and a shape suitable for arranging therein an electronic device, a position for arranging an electronic device is easily ensured even in an ear hole fitting hearing aid 5 with a difficulty in ensuring a position for arranging the electronic device, consequently enabling downsizing of the portable device.

Figure 11:
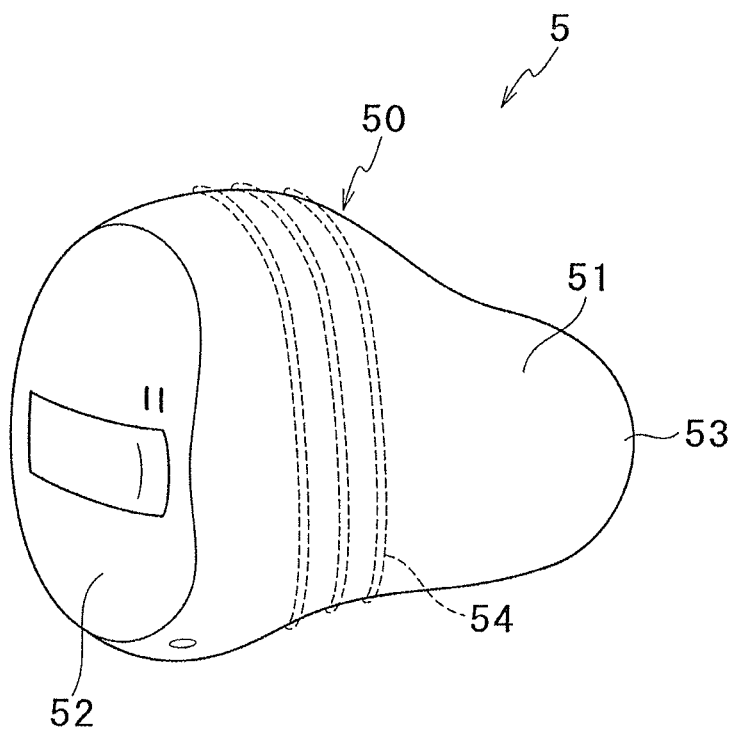
FIG. 11 is an explanatory diagram showing an arrangement of a power-receiving module in the ear hole fitting hearing aid.
Figure 12:
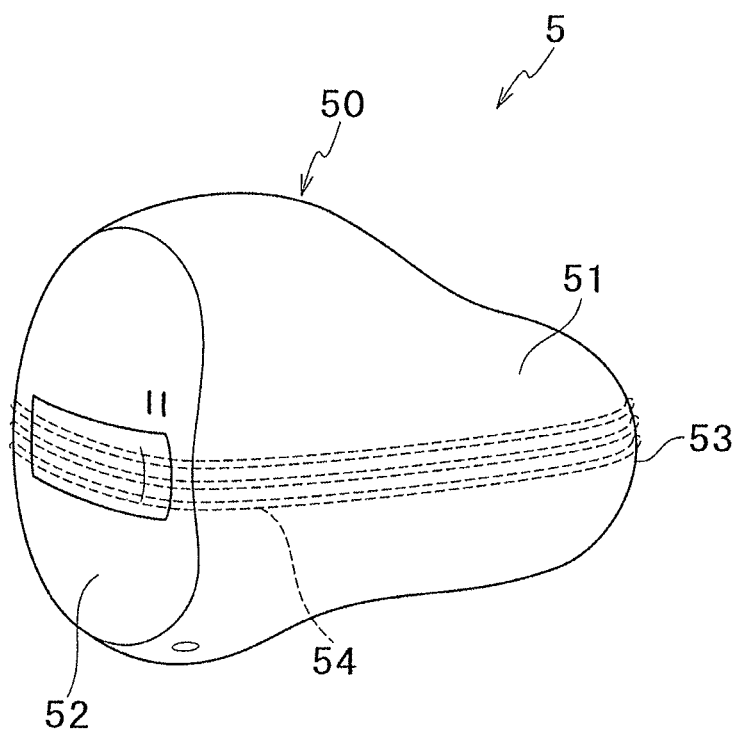
FIG. 12 is an explanatory diagram showing an arrangement of a power-receiving module in the ear hole fitting hearing aid.
Figure 13:
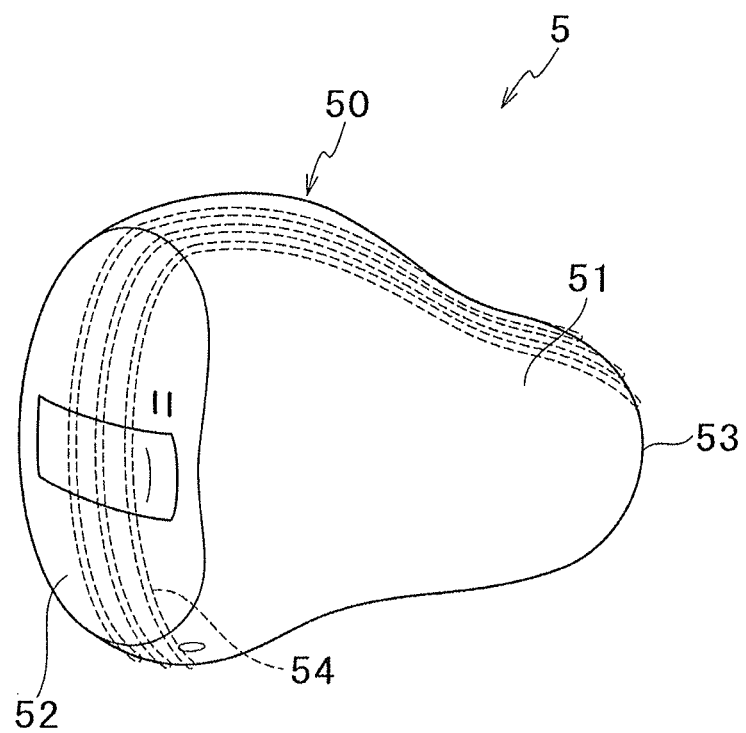
FIG. 13 is an explanatory diagram showing an arrangement of a power-receiving module in the ear hole fitting hearing aid.

The power-receiving module 54 may be formed by a solenoid coil or a planar coil, and there is no particular limitation as to the position and method of arrangement, as long as at least a part of the power-receiving module 54 is disposed along at least one of a surface shape of the shell part 51 or a surface shape of the face plate part 52. For example, the power-receiving module 54 may be formed by a solenoid coil arranged along the outlines of the face plate part 52, or a solenoid coil arranged along the outline of the shell part 51 as shown in FIG. 11. Further, the power-receiving module 54 may be formed by a solenoid coil arranged to cross the outlines of the shell part 51 and the face plate part 52 as shown in FIG. 12 and FIG. 13. Further, the power-receiving module 54 may be formed by a planar coil arranged along an outline of the shell part 51 or the outline of the face plate part 52.

(Hearing Aid: Glasses-Type Hearing Aid)

Figure 14:
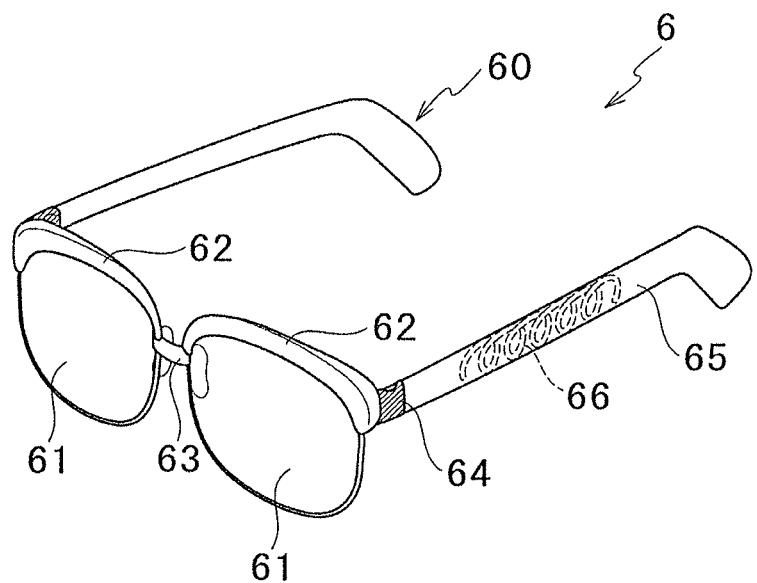
FIG. 14 is an explanatory diagram showing an arrangement of a power-receiving module in a glasses-type hearing aid.

As shown in FIG. 14, a glasses-type hearing aid 6 includes: a frame 60 including a pair of lenses 61 configured to correct eyesight, a pair of rims 62 for supporting the pair of lenses 61, respectively, a bridge 63 for joining the rims 62, closing blocks 64 provided to the rims 62, respectively, and temples 65 to be worn on pinnae, which are supported by the closing blocks 64 in such a manner as to be capable of moving rotationally; a power-receiving module 66 configured to receive power supplied by means of a resonance phenomenon; and an electronic device disposed in a magnetic field space formed by the resonance phenomenon so as to have a magnetic field strength weaker than that in other portions. Further, at least a part of the power-receiving module 66 is disposed along a surface shape of the frame 60. It should be noted that the electronic device has the same structure as that of the electronic device in the above described ear-hanging hearing aid 4.

By arranging at least a part of the power-receiving module 66 along the surface shape of the frame 60, the level of freedom in size and shaping of the space portion with a weak magnetic field is improved. Since the space portion appearing in an inner side position of or a position nearby the power-receiving module 66 is set in a size and a shape suitable for arranging therein an electronic device, a position for arranging an electronic device is easily ensured even in a glasses-type hearing aid 6 with a difficulty in ensuring a position for arranging the electronic device, consequently enabling downsizing of the portable device.

Figure 15:
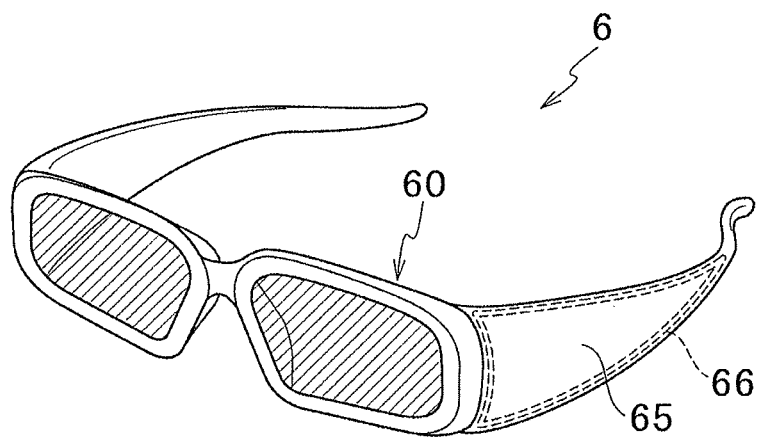
FIG. 15 is an explanatory diagram showing an arrangement of a power-receiving module in the glasses-type hearing aid.
Figure 16:
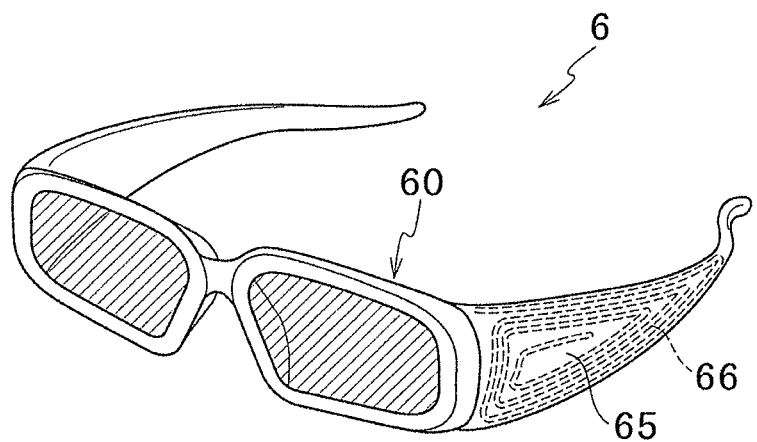
FIG. 16 is an explanatory diagram showing an arrangement of a power-receiving module in the glasses-type hearing aid.
Figure 17:
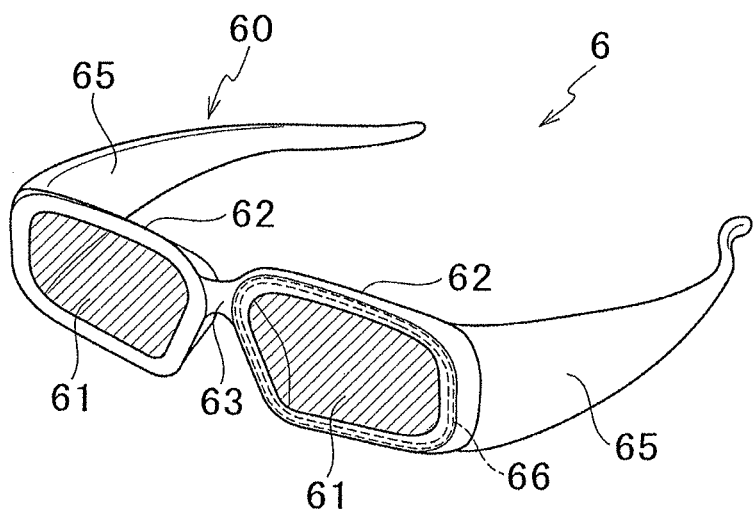
FIG. 17 is an explanatory diagram showing an arrangement of a power-receiving module in the glasses-type hearing aid.
Figure 18:
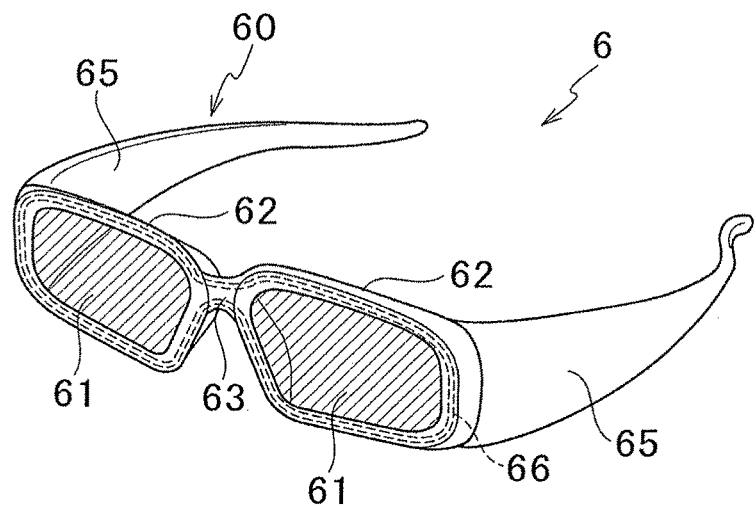
FIG. 18 is an explanatory diagram showing an arrangement of a power-receiving module in the glasses-type hearing aid.

The power-receiving module 66 may be formed by a solenoid coil or a planar coil, and there is no particular limitation as to the position and method of arrangement, as long as at least a part of the power-receiving module 66 is disposed along the surface shape of the frame 60. For example, the power-receiving module 66 may be formed by a solenoid coil arranged along outlines of at least one of the temples 65 and one of the rims 62, as shown in FIG. 15, FIG. 17, FIG. 18. Further, the power-receiving module 66 may be formed by a solenoid coil arranged along an outline of the pair of rims 62, and outlines of the bridge 63, as shown in FIG. 18. Further, the power-receiving module 66 may be formed by a solenoid coil arranged to cross the outline of the temples 65 as shown in FIG. 14. Further, the power-receiving module 66 may be formed by a planar coil arranged on the outer wall surface, on the inside of the outline of at least one of the temples 65 as shown in FIG. 15 and FIG. 16.

(Bluetooth Device)

Figure 19:
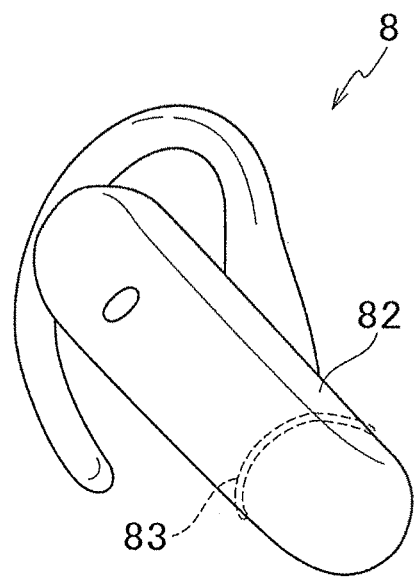
FIG. 19 is an explanatory diagram showing an arrangement of a bluetooth device.
Figure 20:
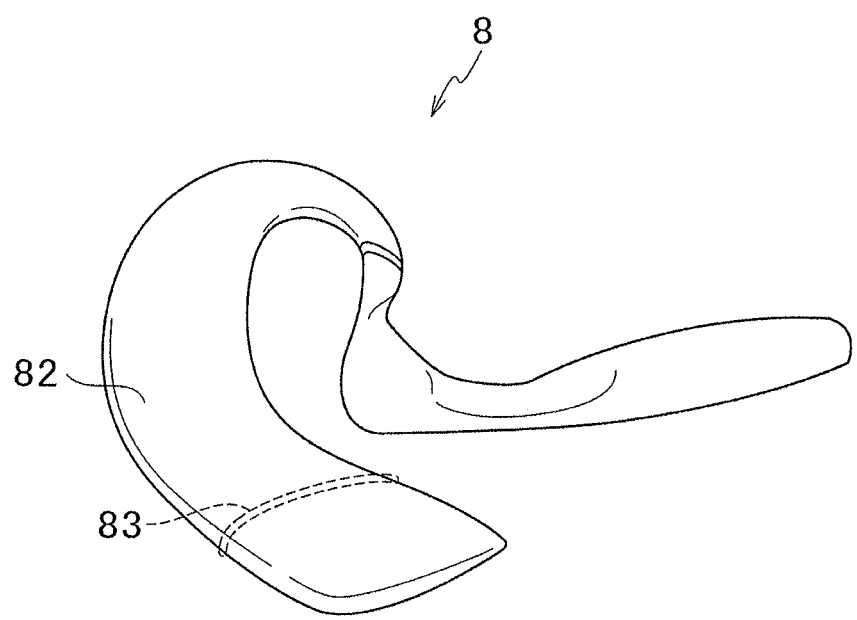
FIG. 20 is an explanatory diagram showing an arrangement of a power-receiving module in the bluetooth device.
Figure 21:
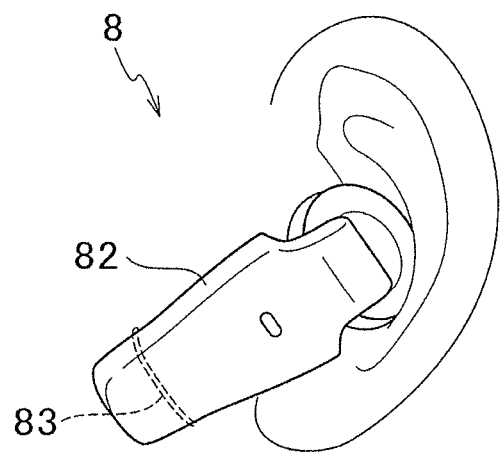
FIG. 21 is an explanatory diagram showing an arrangement of a power-receiving module in the bluetooth device.

As shown in FIG. 19 to FIG. 21, the portable device 1 may be a bluetooth device 8 such as a headset or earphones, capable of receiving audio data in compliance with a wireless communications standard such as Bluetooth (Registered Trademark) standard. That is, by arranging at least a part of the power-receiving module 83 along the surface shape of the housing 82 in the bluetooth device 8, the level of freedom in size and shaping of the space portion with a weak magnetic field is improved, consequently making it easy to ensure a position for arranging the electronic device and enabling downsizing.

(Mobile Phone)

Figure 22:
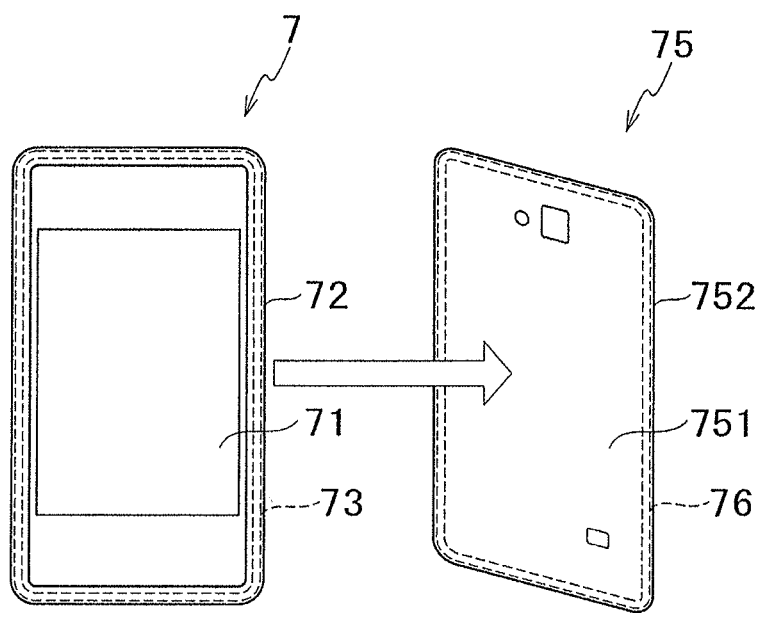
FIG. 22 is an explanatory diagram showing an arrangement of a power-receiving module in a mobile phone.

Next, the following describes a case where the portable device 1 is a mobile phone 7, as shown in FIG. 22. A mobile phone 7 includes: a display unit 71 such as a liquid crystal display device and the like; a housing 72 supporting the display unit 71; a power-receiving module 73 configured to receive power supplied by means of a resonance phenomenon; and an electronic device disposed in a magnetic field space formed by the resonance phenomenon so as to have a magnetic field strength weaker than that in other portions. Further, at least a part of the power-receiving module 73 is disposed along a surface shape of the housing 72 (outer wall member). In other words, the power-receiving module 73 is arranged along the outline which is an external shape of the housing 72.

By arranging at least a part of the power-receiving module 73 along the surface shape of the housing 72, the level of freedom in size and shaping of the space portion with a weak magnetic field is improved. Since the space portion appearing in an inner side position of or a position nearby the power-receiving module 73 is set in a size and a shape suitable for arranging therein an electronic device, a position for arranging an electronic device is easily ensured even in a mobile phone 78 with a difficulty in ensuring a position for arranging the electronic device, consequently enabling downsizing and reduction of the thickness.

Specifically, the mobile phone 7 has a power-receiving module 73 arranged along the side peripheral surface of the housing 72. Further, the mobile phone 7 can be accommodated in a phone case 75 The phone case 75 has a contact portion 751 which contacts one surface of the mobile phone 7, and a side surface wall portion 752 from the circumferential edge of the contact portion 751. Around the side surface wall portion 752 is arranged a power-supplying module 76. It should be noted that the phone case 75 is provided with a not-shown power source unit and a control unit, so as to function as a charging device having the power-supplying module 76. When the mobile phone 7 is placed or mounted on a not-shown charging device such as a charging pad, the power-receiving module 73 of the mobile phone 7 is closely situated at a predetermine distance away from the power-supplying module of the charging device, thus enabling charging of the mobile phone 7 by supplying power from the power-supplying module to the power-receiving module 73. Likewise, when the mobile phone 7 is mounted on a phone case 75, the power-receiving module 73 is closely situated at a predetermine distance away from the power-supplying module 76, thus enabling charging of the mobile phone 7 by supplying power from the power-supplying module 76 to the power-receiving module 73.

Figure 23:
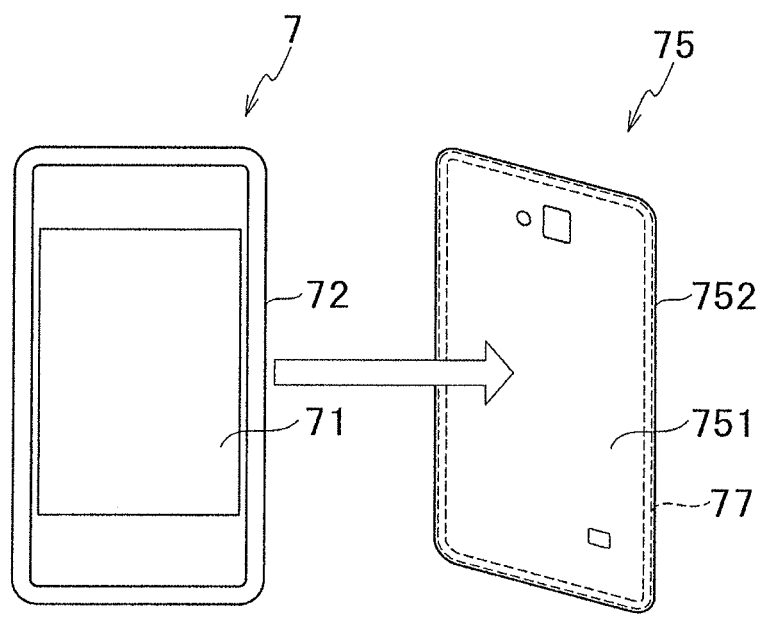
FIG. 23 is an explanatory diagram showing an arrangement of a power-receiving module in a mobile phone mounted to a phone case.

Further, as shown in FIG. 23, it is possible to arrange the power-receiving module 77 around the side surface wall portion 752 of the phone case 75 so that the power-receiving module 77 is arranged around the mobile phone 7 when the mobile phone 7 is mounted on the phone case 75. In other word, it is possible to adopt a structure including: a housing 72 having an outer wall member exposed to outside; a portable case 75 configured to detachably accommodate therein the housing 72; a power-receiving module 77 at least partially arranged along a surface shape of the phone case 75, which receives power supplied by means of a resonance phenomenon; and an electronic device disposed in a magnetic field space formed by the resonance phenomenon so as to have a magnetic field strength weaker than that in other portions. In this case, charging is performed with respect to a mobile phone set including the mobile phone 7 and the phone case 75.

More specifically, the phone case 75 is structured so as to be capable of supplying power to the mobile phone 7 via a signal line or a signal terminal, when the mobile phone 7 is mounted on the phone case 75, and has a power-receiving module 77 on its side surface wall portion 752. Then, when the mobile phone set is placed or mounted on a power-supplying device such as a charging pad having the not-shown power-supplying module, the mobile phone 7 is charged via the power-receiving module 77 of the phone case 75.

It should be noted that the mobile phone 7 may have the power-receiving module 73 shown in FIG. 22 so that the mobile phone 7 is charged by the power-receiving module 73 of the mobile phone 7, when the mobile phone 7 is not mounted on the phone case 75, while the mobile phone 7 is charged by the power-receiving module 77 of the phone case 75 when the mobile phone 7 is mounted on the phone case 75. In other word, it is possible to adopt a structure including: a housing 72 having an outer wall member exposed to outside; a portable case 75 configured to detachably accommodate therein the housing 72; power-receiving modules 73 and 77 which are at least partially arranged along a surface shape of the phone case 75 and a surface shape of the outer wall member respectively, each of which modules receives power supplied by means of a resonance phenomenon; and an electronic device disposed in a magnetic field space formed by the resonance phenomenon so as to have a magnetic field strength weaker than that in other portions.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the present invention, not to limit it. In addition, it will be understood by those skilled in the art that the other structures, systems, methods and the like included in the spirit of the present invention can be easily derived from the spirit of the invention described in the specification. Accordingly, it should be considered that the present invention covers equivalent structures thereof without departing from the spirit and scope of the invention as defined in the following claims. In addition, it is required to sufficiently refer to the documents that have been already disclosed, so as to fully understand the objects and effects of the present invention.

REFERENCE SIGNS LIST

1. Portable device
2. Charging device
3. Charging system
4. Ear-Hanging Hearing Aid
5. Ear Hole Fitting Hearing Aid
6. Glasses-Type Hearing Aid
7. Mobile phone
11. Power-receiving module
12. Outer wall member
13. Electronic device
14. Battery
15. Output unit
16. Input unit
21. Power-supplying module
22. Power source unit

The invention claimed is:

1. A portable device, comprising:
an outer wall member exposed to outside; and
a power-receiving module at least partially arranged along a surface shape of the outer wall member, which receives power supplied by means of a resonance phenomenon, the power-receiving module including a power-receiving resonance coil having an outer circumferential side and an inner circumferential side opposite the outer circumferential side;
an electronic device disposed in a magnetic field space formed by the resonance phenomenon and having a magnetic field strength weaker than that in nearby portions, the magnetic field space being located within a space defined by the power-receiving resonance coil on the inner circumferential side of the power-receiving resonance coil; and
a magnetic member disposed between the electronic device and the power-receiving resonance coil and covering an inner circumferential surface of the power-receiving resonance coil, the magnetic member configured to reduce a magnetic field generated on the inner circumferential side of the power-receiving resonance coil.

2. A charging device, comprising a power-supplying module configured to supply power to the power-receiving module of the portable device according to claim 1, by means of a resonance phenomenon.

3. A portable device charging system, comprising: the portable device according to claim 1; and
a charging device having a power-supplying module configured to supply power to the power-receiving module of the portable device by means of a resonance phenomenon.

4. A portable device, comprising:
a housing having an outer wall member exposed to outside;
a portable case configured to detachably accommodate therein the housing; and
a power-receiving module at least partially arranged along at least either one of a surface shape of the outer wall member and a surface shape of the portable case, which receives power supplied by means of a resonance phenomenon, the power-receiving module including a power-receiving resonance coil having an outer circumferential side and an inner circumferential side opposite the outer circumferential side; and
an electronic device disposed in a magnetic field space formed by the resonance phenomenon and having a magnetic field strength weaker than that in nearby portions, the magnetic field space being located within a space defined by the power-receiving resonance coil on the inner circumferential side of the power-receiving resonance coil; and a magnetic member disposed between the electronic device and the power-receiving resonance coil and covering an inner circumferential surface of the power-receiving resonance coil, the magnetic member configured to reduce a magnetic field generated on the inner circumferential side of the power-receiving resonance coil.

5. A human wearable device, comprising:
an outer wall member exposed to outside; and
a power-receiving module at least partially arranged along a surface shape of the outer wall member, which receives power supplied by means of a resonance phenomenon, the power-receiving module including a power-receiving resonance coil having an outer circumferential side and an inner circumferential side opposite the outer circumferential side;
an electronic device disposed in a magnetic field space formed by the resonance phenomenon and having a magnetic field strength weaker than that in nearby portions, the magnetic field space being located within a space defined by the power-receiving resonance coil on the inner circumferential side of the power-receiving resonance coil; and
a magnetic member disposed between the electronic device and the power-receiving resonance coil and covering an inner circumferential surface of the power-receiving resonance coil, the magnetic member configured to reduce a magnetic field generated on the inner circumferential side of the power-receiving resonance coil.

6. A hearing aid, comprising:
a hearing aid main body attachable to a pinna;
an ear mold to be abutted to or nearby an ear hole opening;
a joint part joining the hearing aid main body and the ear mold; and
a power-receiving module configured to receive power supplied by means of a resonance phenomenon, the power-receiving module including a power-receiving resonance coil having an outer circumferential side and an inner circumferential side opposite the outer circumferential side; and
an electronic component disposed in a magnetic field space formed by the resonance phenomenon and having a magnetic field strength weaker than that in nearby portions, the magnetic field space being located within a space defined by the power-receiving resonance coil on the inner circumferential side of the power-receiving resonance coil; and
a magnetic member disposed between the electronic device and the power-receiving resonance coil and covering an inner circumferential surface of the power-receiving resonance coil, the magnetic member configured to reduce a magnetic field generated on the inner circumferential side of the power-receiving resonance coil.

7. The hearing aid according to claim 6, wherein the power-receiving resonance coil is formed by a solenoid coil disposed along an outline of the hearing aid main body.

8. The hearing aid according to claim 6, wherein the power-receiving resonance coil is formed by a planar coil arranged on an outer wall surface, on the inside of the outline of the hearing aid main body.

9. The hearing aid according to claim 6, wherein the power-receiving resonance coil is formed by a solenoid coil arranged to cross the outline of the hearing aid main body.

10. The hearing aid according to claim 6, wherein the power-receiving resonance coil is formed by a solenoid coil or a planar coil arranged in the periphery of an abutting portion of the ear mold to be abutted to or nearby the ear hole opening.

11. A charging device, comprising a power-supplying module configured to supply power to the power-receiving module of the hearing aid according to claim 6, by means of a resonance phenomenon.

12. A hearing aid charging system, comprising the hearing aid according to claim 6, and a charging device having a power-supplying module configured to supply power to the power-receiving module of the hearing aid by means of a resonance phenomenon.

13. A hearing aid, comprising:
a housing having a cylindrical shell part configured to abut a surface of an external auditory canal in a hear hole, a face plate part arranged on a pinna side of the shell part, a leading end part arranged on the inner ear side of the shell part; and
a power-receiving module configured to receive power supplied by means of a resonance phenomenon, at least a part of the power-receiving module being disposed along at least one of a surface shape of the shell part or a surface shape of the face plate part, the power-receiving module including a power-receiving resonance coil having an outer circumferential side and an inner circumferential side opposite the outer circumferential side;
an electronic component disposed in a magnetic field space formed by the resonance phenomenon and having a magnetic field strength weaker than that in nearby portions, the magnetic field space being located within a space defined by the power-receiving resonance coil on the inner circumferential side of the power-receiving resonance coil; and
and
a magnetic member disposed between the electronic device and the power-receiving resonance coil and covering an inner circumferential surface of a power-receiving resonance coil, the magnetic member configured to reduce a magnetic field generated on the inner circumferential side of the power-receiving resonance coil.

14. The hearing aid according to claim 13, wherein the power-receiving resonance coil is formed by a solenoid coil arranged along an outline of the shell part.

15. The hearing aid according to claim 13, wherein the power-receiving resonance coil is formed by a solenoid coil arranged along an outline of the face plate part.

16. The hearing aid according to claim 13, wherein the power-receiving resonance coil is formed by a solenoid coil arranged to cross the outlines of the shell part and the face plate part.

17. A hearing aid, comprising:
a frame including a pair of lenses configured to correct eyesight, a pair of rims for supporting the pair of lenses, respectively, a bridge for joining the rims, closing blocks provided to the rims, respectively, and temples to be worn on pinnae, which are supported by the closing blocks in such a manner as to be capable of moving rotationally; and
a power-receiving module configured to receive power supplied by means of a resonance phenomenon, at least a part of the power-receiving module being disposed along a surface shape of the frame, the power-receiving module including a power-receiving resonance coil having an outer circumferential side and an inner circumferential side opposite the outer circumferential side;

an electronic component disposed in a magnetic field space formed by the resonance phenomenon and having magnetic field strength weaker than that in nearby portions, the magnetic field space being located within a space defined by the power-receiving resonance coil on the inner circumferential side of the power-receiving resonance coil; and a magnetic member disposed between the electronic device and the power-receiving resonance coil and covering an inner circumferential surface of the power-receiving resonance coil the magnetic member configured to reduce a magnetic field generated on the inner circumferential side of the power-receiving resonance coil.

18. The hearing aid according to claim 17, wherein the power-receiving resonance coil is
formed by a solenoid coil arranged along the outline of one of the temples and/or the outline of one of the rims.

19. The hearing aid according to claim 17, wherein the power-receiving resonance coil is formed by a solenoid coil arranged along an outlines of the pair of rims and the bridge.

20. The hearing aid according to claim 17, wherein the power-receiving resonance coil is formed by a solenoid coil arranged to cross the outline of the temples.

21. The hearing aid according to claim 17, wherein the power-receiving resonance coil is formed by a planar coil arranged on the outer wall surface, on the inside of the outline of at least one of the temples.

* * * * *